May 31, 1927.
O. LINSTADT
1,630,268
AUTOMATIC VALVE FOR WATER TANKS
Filed Nov. 9, 1926
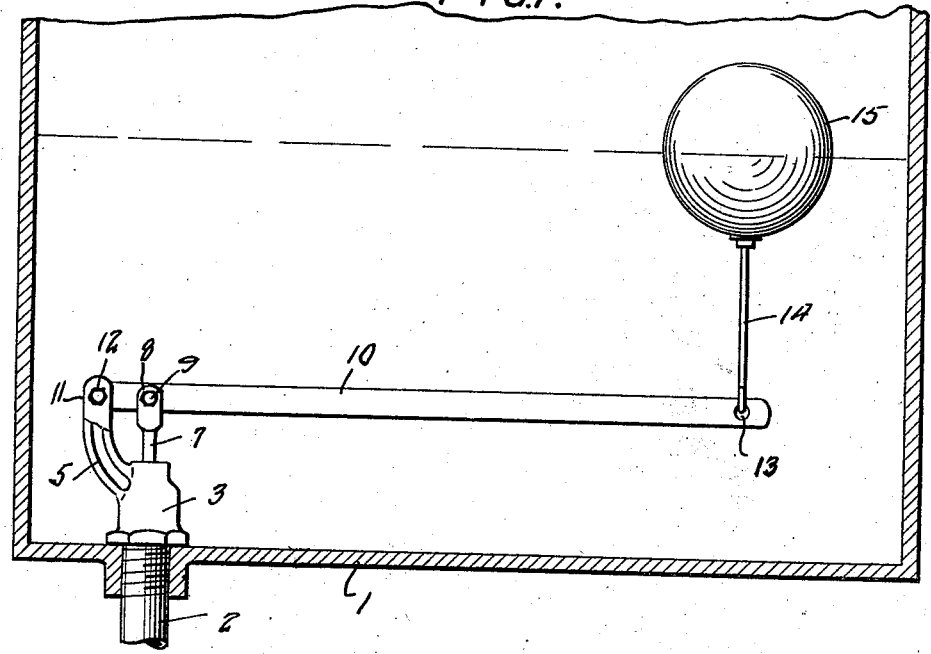
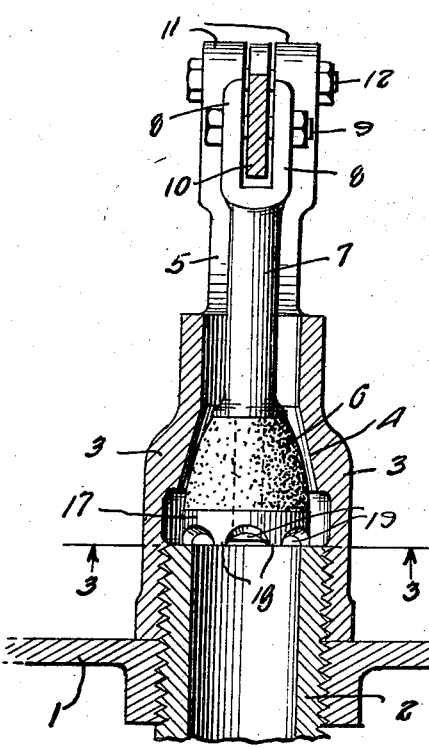
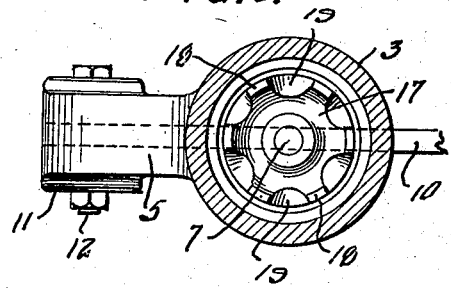
Inventor
OTTO LINSTADT
By Lester L. Sargent
Attorney Patented May 31, 1927.

1,630,268

UNITED STATES PATENT OFFICE.

OTTO LINSTADT, OF MADISON, NEBRASKA.

AUTOMATIC VALVE FOR WATER TANKS.

Application filed November 9, 1926. Serial No. 147,336.

The object of my invention is to provide an improved automatic valve for water tanks which will efficiently maintain the water in the tank at a pre-determined level; and to provide a valve of this type having a relatively few number of parts which can be manufactured at small expense and which will function more efficiently than prior devices of this class.

I attain these and other objects of my invention by the mechanism illustrated in the accompanying drawings, in which,—

Figure 1 is a vertical section through a tank with my valve shown in side elevation;

Fig. 2 is a vertical section through the valve casing on a line at right angles to that on which Fig. 1 is shown; and Fig. 3 is a horizontal section on line 3—3 of Fig 2.

Like numerals designate like parts in each of the several views.

Referring to the accompanying drawings, I provide a suitable water tank 1 having an inflow pipe 2 opening into the bottom of the tank, screw-threaded to it and projecting up into the tank to have a screw-threaded engagement with a threaded valve casing 3 as shown in Fig 2. Valve casing 3 is provided with an upstanding arm 5 which is bifurcated at its upper end 11. Valve casing 3 is provided with a frusto-conical valve seat 4 against which the resilient valve 6 seats. Valve 6 preferably is made of rubber fitted on the valve stem 7 as shown in Fig. 2. Valve stem 7 is bifurcated at its upper end 8 and is pivotally attached to a float rod 10 by the cotter pin or bolt 9, which functions as a pivot member. Float rod 10 is pivotally mounted in the bifurcated end 11 of arm 5 by a cotter pin or bolt 12. Float rod 10 is provided with a suitable aperture 13 in which the wire on link 14 which attaches the float 15 to the float rod 10 may be engaged. The valve stem 7 terminates in a head 17 with a plurality of spaced prongs or lugs 18 which seat on the top surface of the upper end of pipe 2 as shown in Fig. 2 leaving passages 19 between the head 17 and the top surface of the pipe 2. The head 17 is screw-threaded on the end of valve stem 7 which is threaded for the purpose.

The float 15 floats on the water, the level of which is indicated by the dash line in Fig. 1. As the supply of water in the tank is lowered the float is lowered gradually and allows the valve 6 to unseat from valve seat 4, thereby admitting more water into the tank. As the water rises it of course causes the float to rise and raise rod 10 and likewise raise and seat the valve 6 on the valve seat 4 closing the valve passage so that no more water is admitted into the tank until the supply in the tank is again lowered. The lugs or prongs 18 on head 17 rest on the upper surface of pipe 2 as shown in Fig. 2 when the valve is open, the water flowing through the passages 19 between the lugs 18. Valve stem 7 is provided with a threaded lower end on which the head 17 is screwthreaded. In use I have found that the lugs or prongs 18 are important inasmuch as without their use the device would rest flat on pipe 2 and it would take considerable force to raise it before the water would commence to flow through the valve passage easily. But with the lugs this difficulty is obviated.

What I claim is—

1. In an automatic valve for water tanks, the combination of a threaded valve casing, an inflow water pipe on which said valve casing is threaded, an upstanding and offset arm integral with the valve casing, a rod having one end pivotally affixed to said arm, a float connected with the free end of the arm, a valve stem pivotally connected with an intermediate portion of the rod, a resilient valve mounted on the valve stem and adapted to seat in the valve seat of the valve casing, and a head affixed to the lower end of the valve stem and bearing against the valve, said head having spaced lugs adapted to rest on the upper end of the inflow water pipe when the valve is unseated.

2. In an automatic valve for water tanks, the combination of a threaded valve casing, an inflow water pipe on which said valve casing is threaded, an upstanding and offset arm integral with the valve casing, a rod having one end pivotally affixed to said arm, a float connected with the free end of the arm, a valve stem pivotally connected with an intermediate portion of the rod, a valve mounted on the valve stem and adapted to seat in the valve seat of the valve casing, and a head affixed to the lower end of the valve stem and bearing against the valve, said head having spaced lugs adapted to rest on the upper end of the inflow water pipe when the valve is unseated.

3. In an automatic valve for water tanks, the combination of a threaded valve casing, an inflow water pipe on which said valve casing is threaded, the valve casing having an upstanding offset arm, a float rod pivotally attached to the upper end of said arm, a float suitably attached to the free end of the rod, a valve stem pivotally attached to and depending from the rod near the end distant from the float, a valve on the lower end of said valve stem, a head below said valve affixed to the valve stem, said head having a plurality of spaced lugs adapted to rest on the top of the inflow water pipe when the valve passage is opened, substantially as described.

OTTO LINSTADT.